Patented May 6, 1924.

1,492,661

UNITED STATES PATENT OFFICE.

EDWARD E. ARNOLD, OF COVENTRY, RHODE ISLAND, ASSIGNOR TO THE NITROGEN CORPORATION, OF PROVIDENCE, RHODE ISLAND, A CORPORATION OF RHODE ISLAND.

PROCESS FOR FORMING CHEMICAL COMPOUNDS.

No Drawing.    Application filed August 19, 1921.   Serial No. 493,705.

*To all whom it may concern:*

Be it known that I, EDWARD E. ARNOLD, a citizen of the United States, residing at Coventry, in the county of Kent and State of Rhode Island, have invented certain new and useful Improvements in Processes for Forming Chemical Compounds, of which the following is a specification.

This invention relates to a process for forming chemical compounds, and comprises certain novel steps and combination of steps adapted to be employed in an interrelated series of operations for effecting the purification of iron and the formation of valuable by-products adapted for use in the manufacture of sodium bicarbonate.

One object of the invention is to provide an improved means for obtaining carbon dioxid gas for use in the manufacture of sodium bicarbonate.

Another object of the invention is to provide an improved process for forming carbon dioxid and sodium bicarbonate in connection with the purification of iron whereby certain of the products resulting from the purification of the iron are utilized directly in the formation of carbon dioxide and sodium carbonate, thus effecting great saving in the cost of materials and utilizing products ordinarily not recoverable.

Another object of the invention is to provide an improved process of this character whereby various by-products may be formed in connection with the purification of iron and recovered for use in the formation of sodium bicarbonate, and gases employed in carrying out the ammonia soda process may be in turn recovered and utilized in effecting the purification of the iron.

Other objects of the invention comprise the use of certain novel steps and combinations of steps in the effectuation of the process as will be more fully disclosed in the detailed description to follow.

In a copending application 472,554, filed May 25, 1921, the process of purifying crude iron by means of a blast of nitrogen gas, whereby the nitrogen combines with the carbon present in the molten metal to form cyanogen compounds, is described at considerable length and in my improved process I may follow the procedure as set forth in the above application so far as it relates to the treatment of the molten metal with nitrogen gas, although the present invention differs therefrom widely, in the manner of treating and utilizing the products obtained as a result of the purification of the iron.

In carrying out my improved process I may make use of the ordinary Bessemer converter provided with a suitable fire proof lining, and mounted upon trunnions in the usual manner. At the base of the converter is the usual air chamber communicating with the interior of the converter thru a plurality of openings or tuyères. The molten metal may be placed in the converter in the usual manner, and subjected to an air blast for forcing air from the air chamber thru the tuyères into the molten metal to remove certain impurities therefrom, such as silicon. Since the reaction between the silicon and the oxygen of the air is strongly exothermic, a considerable degree of heat is evolved during the oxidation of the silicon as above described which serves to raise the temperature of the molten metal and thus promote the reactions which will be hereinafter described. As the silicon in the crude iron is the first of the various impurities present therein to be removed by the air blast, and since from two to four minutes usually suffices for its removal, I purpose to employ the air blast as above described only for such time as is necessary to remove or substantially remove the silicon, when I cut off the supply of compressed air to the air chamber at the base of the converter, and simultaneously connect the air chamber with a supply of nitrogen maintained under sufficient pressure to force the same thru the tuyères and into the molten mass in a manner similar to that in which air was forced therethru by the air blast.

The heat generated by the air blast raises the temperature of the molten metal to such an extent that the nitrogen gas reacts both with the graphitic and combined carbon in the molten iron to form therewith cyanogen and cyanogen compounds which pass off as gases.

In order to facilitate the recovery of the gaseous products formed by the reaction between the nitrogen and the molten metal it may be advisable to either provide the converter with a hood communicating with separation chambers and so formed that it may be opened to permit the escape of the gases formed during the air blast and closed to conduct the gaseous products of the nitrogen blast to said chambers, or the converter may be movably mounted and so positioned that during the air blast the gaseous products formed therein may escape, while allowing the converter to be swung into position beneath a suitable hood just prior to the commencement of the nitrogen blast to conduct the carbo-nitrogenous compounds formed by reaction with the nitrogen into the said chambers. The carbo-nitrogenous compounds of the reaction between the nitrogen and the carbon of the molten metal comprise mainly cyanogen and hydrocyanic acid.

This process contemplates preferably the use in a Bessemer converter, or modified form of Bessemer converter, of pure or substantially pure nitrogen. A part of the nitrogen required may be obtained by liquefaction of air, although after the process is once in successful operation a part or all of the nitrogen required may be obtained in a manner which will be hereinafter described.

It is my purpose to react upon the carbo-nitrogenous compounds (cyanogen and the like) by admitting steam to the separation chambers and passing the mixture of steam and cyanogen compounds through passages at suitable temperatures, above 100° C., whereupon the steam reacts with the cyanogen or hydrocyanic acid to form ammonia, carbon dioxid and carbon monoxid. I may use a suitable mixture of air and steam for reacting upon the cyanogen compounds since I am able thereby to secure a complete or substantially complete conversion of carbon monoxid to carbon dioxid, the main products of the reaction being ammonia, carbon dioxid and nitrogen. The reaction between the steam and the cyanogen compounds, or the mixture of steam, air and cyanogen compounds as above described is preferably effected in the presence of finely divided contact material such as pumice stone or the like.

Upon the completion of the step above described of reacting upon the cyanogen compounds to convert the same to ammonia and carbon dioxid, or to ammonia, carbon dioxid and nitrogen I separate the carbon dioxid or the carbon dioxid and ammonia from the nitrogen by absorbing the carbon dioxid and ammonia in water, or by conducting the gas mixture through the carbonating towers of an ammonia soda apparatus where the gases are brought into contact with ammoniated brine in the usual manner to form sodium bicarbonate and ammonium chlorid. The nitrogen serves as a diluent for the carbon dioxid in the reaction with the ammoniated brine in the carbonating towers whereby a better yield of sodium bicarbonate crystals results than would be the case if the carbon dioxid gas was employed without any inert gas being present as a diluent.

The ammonia obtained by treating the cyanogen compounds with superheated steam may be and preferably is utilized in forming the ammoniated brine used in the carbonating towers of the ammonia soda process.

The nitrogen gas remaining after the removal of the carbon dioxid in the carbonating towers is preferably recovered and utilized for effecting the purification of the molten metal after the manner previously described in connection with the nitrogen blast.

After the removal from the molten iron of the impurities mentioned, any desired grade of steel may be obtained by the addition of suitable proportions of metallic alloys as is the usual practice in the manufacture of steel by the Bessemer process.

It is to be understood that in the step of passing nitrogen through the molten metal only a portion of the nitrogen employed reacts with the carbon contained in the metal to form carbo-nitrogenous or cyanogen bearing compounds, the balance of the nitrogen remaining unchanged, thus resulting in the production of a gaseous mixture consisting mainly of cyanogen bearing gases and nitrogen. When the gaseous mixture thus produced is treated with steam as above described the cyanogen bearing gaseous component of the mixture is converted mainly into ammonia and carbon dioxid while the nitrogen content remains unchanged thus forming a gaseous mixture containing ammonia, carbon dioxid and nitrogen which upon contact with a sodium chloride solution forms sodium carbonate by reaction between the ammonia, carbon dioxid and sodium chloride while the nitrogen acts as an inert diluent and may be recovered and reused as stated above.

From the above description it will be seen that the present invention contemplates a novel interrelation of the operation of eliminating impurities from crude iron for the purpose of forming steel and the effectuation of the ammonia soda process whereby valuable byproducts formed in the treatment of the iron are recovered and utilized in the carrying out of the ammonia soda process and one of the said by-products is further recovered and again used in the purification of iron.

In this way great economies of manufacture are effected and the cost of carrying out the operations very materially reduced.

Although I have described in considerable detail certain precise steps and sequence of steps which I have found it desirable to employ, as well as certain particular substances and compounds which I have found to be efficient in use, in order to make clear to those skilled in the art one method of practicing the invention, it is to be understood that I do not intend to be limited to the precise materials designated as preferred nor the exact steps or sequence of steps indicated as preferred, except as the same may be included within the terms of the following claims when broadly construed in the light of my invention.

Having described my invention, what I claim is:

1. A process for forming chemical compounds which comprises, treating a gaseous mixture containing cyanogen bearing gases and nitrogen with steam to form ammonia, carbon dioxid and nitrogen; and effecting a reaction between the ammonia, carbon dioxid and sodium chloride to form sodium bicarbonate and separate the nitrogen from the gaseous mixture.

2. A process for forming chemical compounds which comprises, treating a gaseous mixture containing cyanogen bearing gases and nitrogen with steam to form ammonia, carbon dioxid and nitrogen; and reacting upon the gaseous mixture thus formed with ammoniated brine to form sodium bicarbonate and separate the nitrogen gas from the mixture.

3. A process for forming chemical compounds which comprises, treating a gaseous mixture containing cyanogen bearing gases and nitrogen with steam in the presence of air to form ammonia, carbon dioxid and nitrogen; and effecting a reaction between the ammonia, carbon dioxid and sodium chloride to form sodium bicarbonate and separate the nitrogen from the ammonia and carbon dioxid.

4. A process for forming chemical compounds which comprises, treating a gaseous mixture containing cyanogen bearing gases and nitrogen with steam in the presence of air to form ammonia, carbon dioxid and nitrogen; and reacting upon the gaseous mixture thus formed with ammoniated brine to form sodium bicarbonate and separate the nitrogen gas from the mixture.

5. The process which comprises, reacting upon molten iron containing carbon, with nitrogen gas to form cyanogen compounds, treating the gases thus formed with steam to form a gaseous mixture comprising ammonia, carbon dioxid and nitrogen, contacting the gaseous mixture thus formed with a sodium chloride solution to form sodium bicarbonate and separate the nitrogen from the accompanying gases.

In testimony whereof I have affixed my signature.

EDWARD E. ARNOLD.